Patented Dec. 29, 1931

1,839,135

UNITED STATES PATENT OFFICE

FERNANDO SOMOZA VIVAS, OF BRONXVILLE, NEW YORK, ASSIGNOR TO INTERNATIONAL FIREPROOF PRODUCTS CORPORATION, OF NEW YORK, N. Y., A CORPORATION OF DELAWARE

PROCESS OF FIREPROOFING CELLULOSIC MATERIAL AND COMPOSITION FOR USE THEREIN

No Drawing.   Application filed November 14, 1929.   Serial No. 407,280.

The invention relates to the art of fireproofing cellulosic materials.

It is an object of the invention to provide a process of producing or treating materials of cellulose fibres as wallboard, pressboard, paper, wood or the like to make the same non-inflammable and not merely flame-resistant.

It is a further object of the invention to provide a process of the nature referred to which will not substantially increase the weight of the material and in fact when used during the process of the original manufacture of such material may produce a material which is actually not as heavy as material of the same nature made in the usual way.

It is a further object of the invention to provide a process of fireproofing manufactured cellulosic material utilizing combined binder and fireproofing agents whereby to produce material having greater strength than untreated material.

It is a further object of the invention to provide a binding and fireproofing material which will not interfere with the heat insulating character of uncompressed or slightly compressed manufactured materials, when used in the manufacture thereof, and when used with heavily compressed materials as pressboard, calendered paper, or natural lumber will act as a filler or size.

Other objects of the invention will appear from the following description of an illustrative embodiment of the invention.

To attain the objects of the invention a solution of the following materials may be used in substantially the named proportions:

1½ pounds magnesium sulphate
½ pound borax
½ pound ammonium sulphate
1.6 ounces dextrine.

The above named materials are dissolved in water to produce a solution having a specific gravity of substantially 18° Bé. at substantially 100° F.

In treating wood or already manufactured wallboard, pressboard, paper, or the like in accordance with the invention, the material is impregnated with a solution prepared as above, the excess solution is expressed therefrom in the case of manufactured materials and the material is then dried for use.

When the invention is applied during the manufacture of material of cellulosic fibres, the solution prepared as above is substituted for water in the beater and the pulp is beaten in the usual manner and formed into a sheet in any usual manner when it will be found that the completed material is stronger and lighter than like material prepared as heretofore and in addition the fibres cohere more thoroughly and the material is absolutely non-inflammable. Wallboard prepared according to the process of the invention, as well as pressboard, so prepared, is found to have greater strength than any such material heretofore known.

In application of the invention to the manufacture of material of cellulosic fibres it is important for economic reasons to preserve the solution removed from the sheet during the formation thereof, which solution may be returned to the beater for reuse.

In the preparation of pressboard by the process of the invention the solution should be given a higher specific gravity than above indicated as for instance a specific gravity of substantially 21° Bé. at 120° F. and pressboard so prepared is found to require considerably less pressure and lower temperature for its production and to compare favorably with natural woods in breaking strength.

Paper, wallboard, or the like prepared by the process described may be made water-repellant by spraying the substantially finished sheet upon one or both surfaces with melted stearic acid. Common tallow is found to be a satisfactory equivalent for stearic acid for this use. When so treated the stearic acid or its equivalent is found to combine with the material with which the sheet is impregnated as above described upon and near the surface of the sheet to form starates of the impregnating materials, which stearates being non-inflammable do not interfere with the fireproof qualities of the material and the interior of the sheet is left in a porous condition and therefore the heat insulating qualities of the sheet are not destroyed.

Minor changes in the steps of the process or in the quantities of ingredients used may be made within the scope of the following claims without departing from the spirit of the invention.

I claim:

1. The process of manufacturing fireproof wallboard, paper, or the like, from pulp which comprises beating pulp with the necessary quantity of an aqueous solution of the following materials in substantially the named quantities, i. e., 1½ pounds magnesium sulphate
  ½ pound borax
  ½ pound ammonium sulphate
  1.6 ounces dextrine and water to provide a solution having a specific gravity of substantially 18° Bé. at substantially 100° F. and producing a sheet of material from the thus treated pulp in a usual manner.

2. The process of manufacturing fireproof and waterproof wallboard, paper, or the like, from pulp which comprises beating pulp with the necessary quantity of an aqueous solution of the following materials in substantially the named quantities, i. e., 1½ pounds magnesium sulphate
  ½ pound borax
  ½ pound ammonium sulphate
  1.6 ounces dextrine and water to provide a solution having a specific gravity of substantially 18° Bé. at substantially 100° F., producing a sheet of material from the thus treated pulp in a usual manner, drying and compressing the sheet and spraying a surface thereof with melted material adapted to combine with the impregnant to form a stearate in the sheet adjacent the surface thereof.

3. A sheet of noncombustible material comprising matted cellulose fibers intermixed with magnesium and ammonium sulphates and borax and a small proportion of dextrine.

4. A sheet of noncombustible material comprising matted cellulose fibers intermixed with magnesium and ammonium sulphates and borax and a small proportion of dextrine, and containing stearates of the some of the last three named substances at and adjacent to one surface thereof.

5. The process of manufacturing non combustible wallboard, paper or the like which comprises beating pulp material with an aqueous solution of magnesium and ammonium sulphates, borax and dextrine and forming a sheet of the thus prepared stock.

6. The process of manufacturing non combustible wallboard, paper or the like which comprises beating pulp material with an aqueous solution of a major portion of magnesium sulphate and a minor portion each of borax and ammonium sulphate together with a relatively small portion of dextrine.

FERNANDO SOMOZA VIVAS.